US005463527A

United States Patent [19]
Hager et al.

[11] Patent Number: 5,463,527
[45] Date of Patent: Oct. 31, 1995

[54] SUSPENSION SYSTEM FOR DISK DRIVES UTILIZING SHEAR LOADED ELASTOMERIC SUPPORTS OF DIFFERENT DUROMETER HARDNESSES AND ELASTOMERIC PADS

[75] Inventors: Robert J. Hager, Streetsboro; Warren K. Gibson, Eastlake; Oral G. Lyons, Bay Village, all of Ohio

[73] Assignee: Allen-Bradley Company, Inc., Milwaukee, Wis.

[21] Appl. No.: 132,550

[22] Filed: Oct. 6, 1993

[51] Int. Cl.$^6$ .............................. G06F 1/16; F16M 13/00; H05K 7/12
[52] U.S. Cl. .......................................... 361/685; 248/581
[58] Field of Search ............................ 248/60, 581, 609, 248/611, 615, 634, 635, 638; 360/97.01, 137; 361/685; 364/708.1

[56] References Cited

U.S. PATENT DOCUMENTS

| | | | |
|---|---|---|---|
| 4,415,391 | 11/1983 | Reid | 248/60 X |
| 4,639,863 | 1/1987 | Harrison et al. | 361/685 X |
| 4,713,714 | 12/1987 | Gatti et al. | 248/581 X |
| 5,216,582 | 6/1993 | Russell et al. | 361/685 |
| 5,240,222 | 8/1993 | Seeley et al. | 248/638 |
| 5,333,098 | 7/1994 | De Luca et al. | 361/685 |

*Primary Examiner*—Michael W. Phillips
*Attorney, Agent, or Firm*—Mark W. Pfeiffer; John J. Horn; H. F. Hamann

[57] ABSTRACT

A disk drive support system suspends a disk drive within a sleeve-like support housing from two upper corners and two lower corners using four parallelepiped shaped elastomeric mounts, one bridging the drive and housing at each corner. Each mount has one zone affixed to the drive and another opposite zone affixed to the housing by tangs on the drive and housing which engage two respective slots in the mount. A third slot is formed in the mount between the two zones so that there is no straight line path between the zones through the material of the mount which is not interrupted by the slot. The third slot thereby prevents transmission of direct compressive forces between the two zones, and thus requires at least some component of force acting between the two zones to act in shear. Shock absorber pads are provided on the disk drive which are separated from the housing by an air space so as to absorb shocks but not transmit vibrations. The housing may be fixed to a printed circuit board which is oriented vertically. The two upper elastomeric mounts are of a higher durometer hardness than the two lower elastomeric mounts.

10 Claims, 4 Drawing Sheets

U.S. Patent Oct. 31, 1995 Sheet 2 of 4 5,463,527
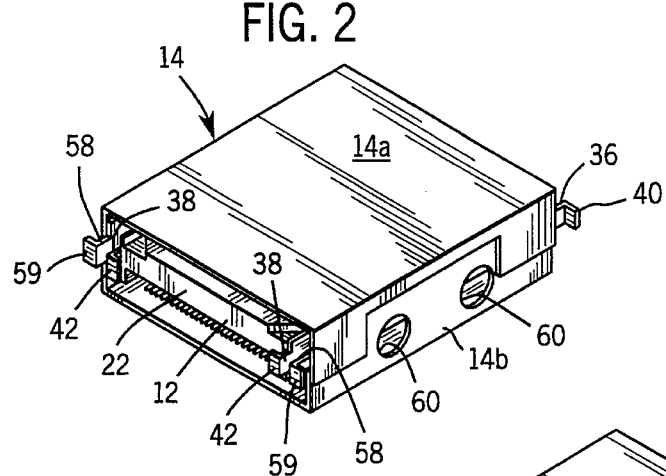
FIG. 2
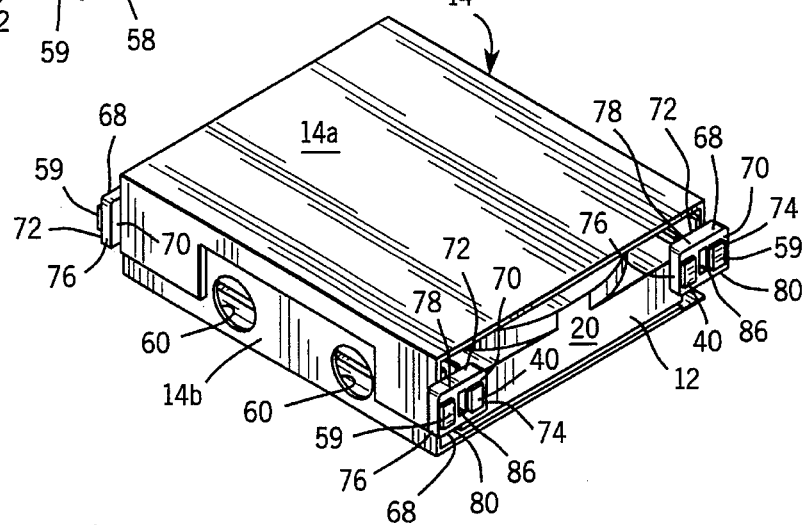
FIG. 3
FIG. 4

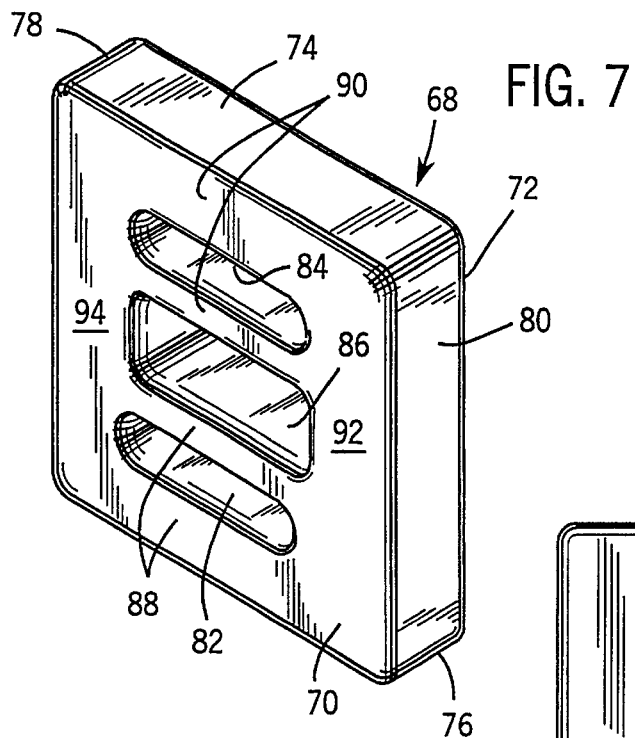
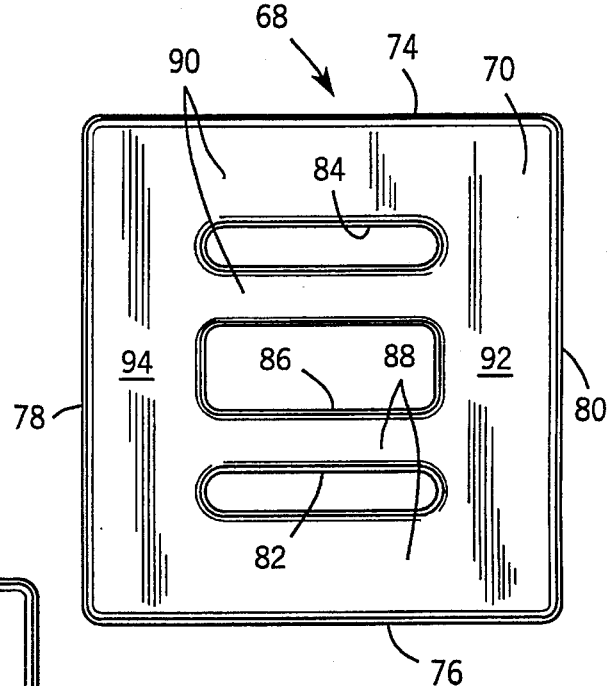
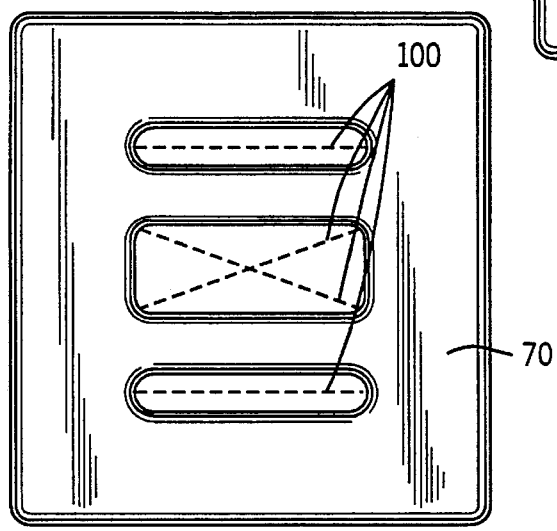
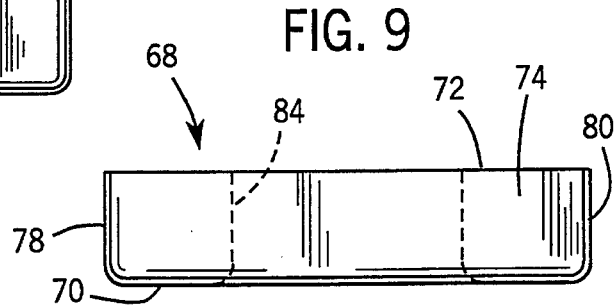

SUSPENSION SYSTEM FOR DISK DRIVES UTILIZING SHEAR LOADED ELASTOMERIC SUPPORTS OF DIFFERENT DUROMETER HARDNESSES AND ELASTOMERIC PADS

BACKGROUND OF THE INVENTION

1. Field of the Invention

This invention relates to suspension systems for isolating a computer disk drive from shock and vibration.

2. Discussion of the Prior Art

Suspension systems for isolating computer disk drives from shock and vibration are known, for example, from U.S. Pat. No. 4,685,303. In such systems, springs have been employed to isolate the disk drive from the source of shock or vibration. However, a significant amount of space was needed to allow for spring travel so that the springs would operate as intended. With downsizing of computer components in general and especially of disk drives, space in the packaging of a computer system is now at a premium and the significant space previously taken by shock and vibration isolation springs is no longer available.

Energy absorbing elastomers are also known, such as are described in U.S. Pat. No. 4,346,205. Such elastomers need less room to function than springs and have been applied to computer disk drive support applications. The known prior elastomeric disk drive mounts have been quite effective to isolate the disk drive from shock, but have not been completely satisfactory to isolate the disk drive from vibration, i.e., high frequency low amplitude mechanical energy.

SUMMARY OF THE INVENTION

The present invention is directed toward providing an elastomeric support for a disk drive which provides improved shock and vibration isolation to the disk drive. A disk drive support system of the invention has a support housing, a disk drive and an elastomeric mount between the housing and disk drive. The mount includes a first portion for fixation to the support housing, a second portion for fixation to the disk drive and a third portion connecting the first portion and the second portion. The third portion engages the first and second portions so that, when the first and second portions are moved closer together, shear forces are imparted between the third portion and the first and second portions and no forces are transmitted through the mount between the first and second portions along a straight line between the first and second portions. Thereby, the mount is subjected to shear stresses in all directions of travel of the housing relative to the drive, and is not ever subjected to pure compression, so that it is highly effective to absorb vibrational energy.

Preferably, the first, second and third portions are made integral with one another, and a plurality of the mounts suspend the disk drive within the support housing. Two mounts can be positioned above the disk drive and two mounts positioned below the disk drive. In an especially useful aspect, the two mounts positioned above the disk drive are of a higher durometer hardness than the two mounts positioned below the disk drive, so as to equalize the loads born by the top and bottom mounts.

In another useful aspect, elastomeric pads are positioned between but do not span confronting surfaces of the support housing and the disk drive. The pads absorb shock loads but do not transmit vibrations from the housing to the disk drive.

In an especially preferred form, the mount is a parallelepiped shaped elastomeric body having a disk mounting portion adapted for securement to a disk drive and a housing mounting portion adapted for securement to a housing. The body has at least one void between the disk mounting portion and the housing mounting portion such that there is no straight line path between the disk mounting portion and the housing mounting portion which is not interrupted by a void in the body. Thereby, the mount is not subjected to direct compression between the two mounting portions and is loaded in shear, to take advantage of the properties of the elastomeric material of the mount to absorb vibrational energy when it is loaded in shear.

In an especially useful form, each of the mounting portions includes a slot. The slot in the disk drive mounting portion is adapted to closely receive a tang affixed to the disk drive and the slot in the housing mounting portion is adapted to closely receive a tang affixed to the housing. Each of the tangs has a rectangular cross sectional area and the slots and the void are in general registration with one another. Thereby, a simple sheet metal connection can be employed to practice the invention without direct compression of the mount between the two mounting portions.

Other features and advantages of the invention will be apparent from the following description and from the drawings.

BRIEF DESCRIPTION OF THE DRAWINGS

FIG. 2 is a rear perspective view of the support system of FIG. 1, but shown without elastomeric mounts;

FIG. 3 is a front perspective view of the support system of FIG. 1 shown with elastomeric mounts;

FIG. 4 is an exploded perspective view of the support system of FIG. 1;

FIG. 7 is a perspective view of an elastomeric mount for the support system of FIG. 1;

FIG. 8 is a front elevation view of the mount shown in FIG. 7;

FIG. 9 is a top elevation view of the mount shown in FIG. 7; and

FIG. 10 is a front elevation view of an alternate embodiment of a mount which is similar to the mount shown in FIGS. 7–9.

DETAILED DESCRIPTION OF THE PREFERRED EMBODIMENTS

Figure 1:
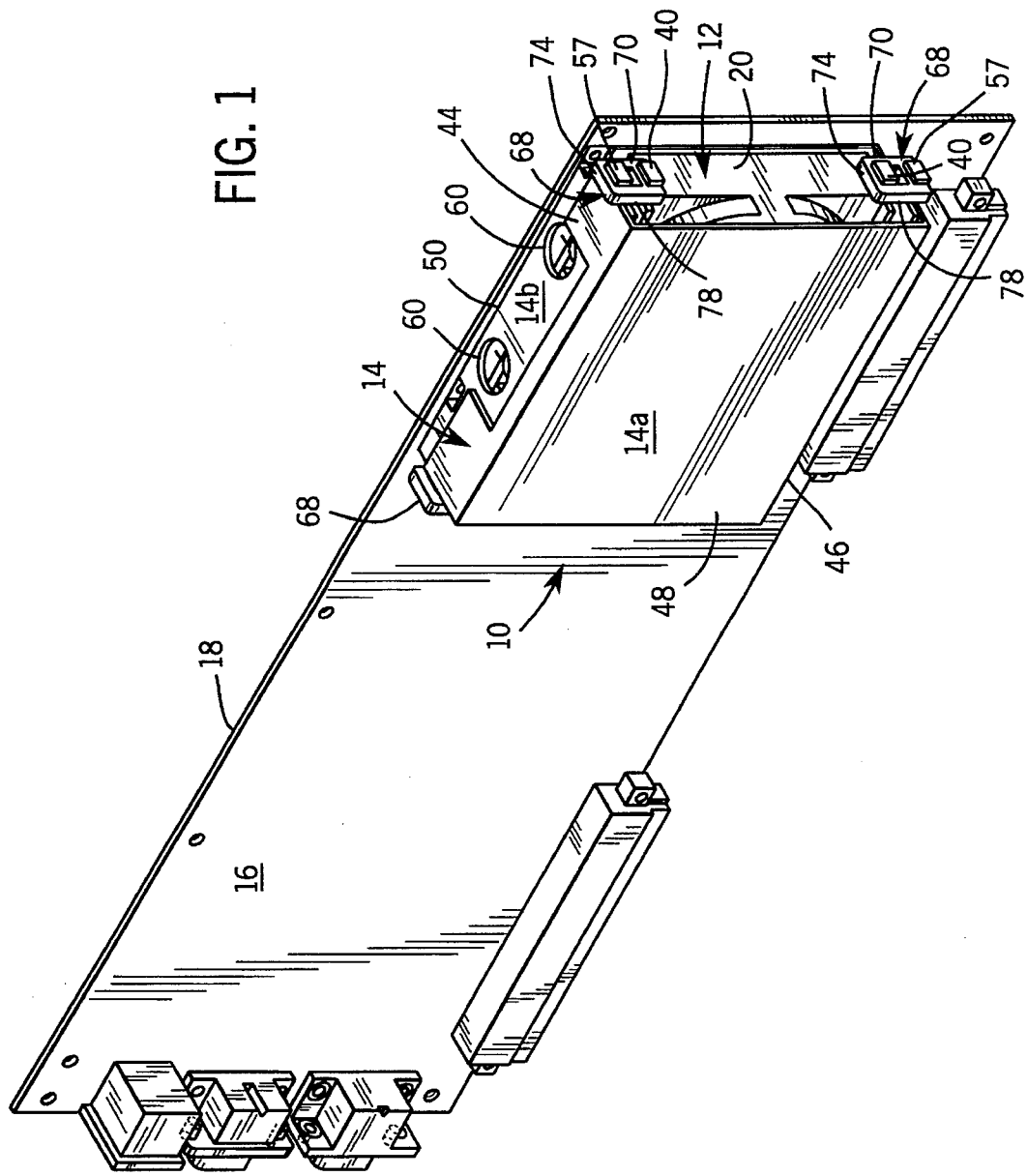
FIG. 1 is a front perspective view of a disk drive support system of the invention mounted on a panel.

FIG. 1 illustrates a support system 10 of the invention for suspending a disk drive 12 within a housing 14. The support system 10 is mounted to a panel 16 which would be mounted inside a cabinet (not shown) of a computer system. The panel 16 may be a printed circuit board of the computer system in which the drive 12 is incorporated. In the preferred embodiment disclosed, it is intended that the panel 16 be vertically oriented with its edge 18 generally horizontal and positioned at the top.

Referring to FIGS. 2–6, the disk drive 12 may be any type of computer disk drive and in the preferred embodiment is a 2.5 inch hard disk drive. The disk drive 12 is generally 6-sided, having a front side 20, rear side 22, top side 24, bottom side 26, left side 28 and right side 30.

As best shown in FIGS. 2–6, each top side 24 and bottom side 26 has secured thereto a bracket 32 by screws 34. Each bracket 32 has a tang 36 at its front end and a tang 38 at its rear end. The tangs 36 and 38 extend beyond the corresponding front 20 and rear 22 sides of the disk drive 12 and terminate at an inwardly directed ear 40 and 42, respectively.

As shown best in FIGS. 1–4, the housing 14 is in the shape of a sleeve, having a top side 44, a bottom side 46, a left side 48 and a right side 50, and with open front and rear sides. The housing 14 can preferably be made from two pieces of sheet metal 14a and 14b, which are formed into U-shapes and secured together, such as by welding or other suitable means, at the top side 44 and the bottom side 46 where the two pieces 14a and 14b overlap. The housing 14 can be secured to the panel 16 by any suitable means, such as threaded studs welded or otherwise affixed to the right side 50 of housing 14, extending therefrom through panel 16, and secured with nuts to panel 16.

The housing 14 has a pair of front tangs 56 extending from top and bottom sides 44 and 46, respectively and in general registration and spaced apart from the front tangs 36 of the brackets 32. Tangs 56 terminate at outwardly directed ears 57.

The housing 14 also has rear tangs 58, which terminate at outwardly directed ears 59, extending from the top 44 and bottom 46 sides in general registration with and spaced apart from the rear tangs 38 of the brackets 32. In the preferred embodiment, the front 56 and rear 58 tangs extend from sheet metal piece 14b, which has its top and bottom sides positioned inside of the top and bottom sides of the sheet metal piece 14a. Also, sheet metal piece 14b has holes 60 formed in its top and bottom sides for ventilation of the disk drive 12.

Figure 5:
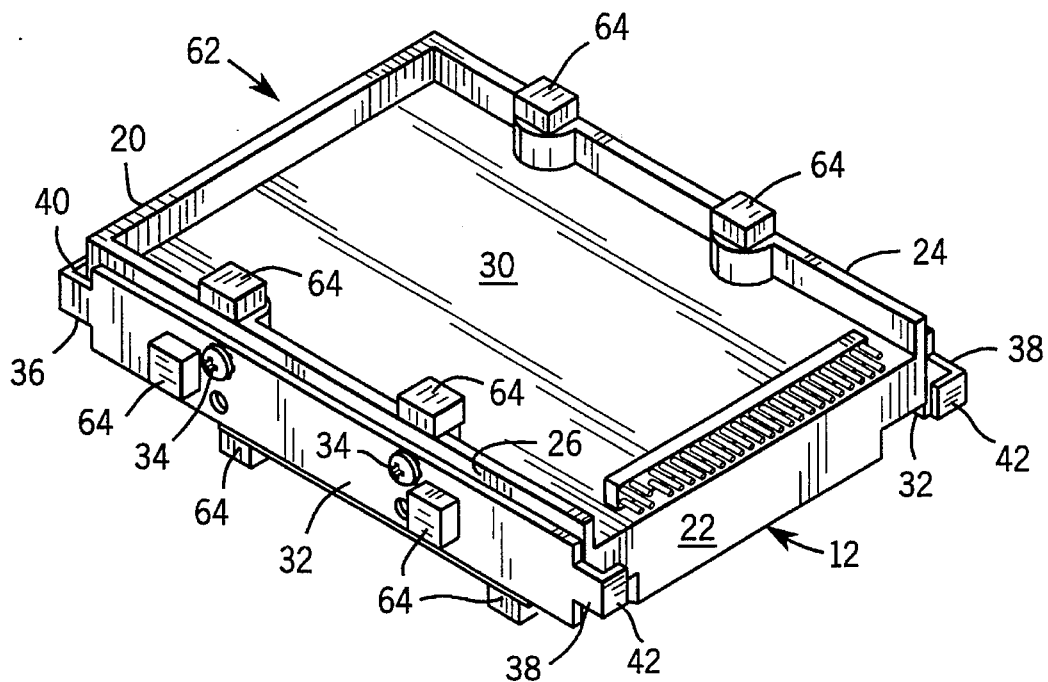
FIG. 5 is a rear perspective view of a disk drive assembly for the support system of FIG. 1.
Figure 6:
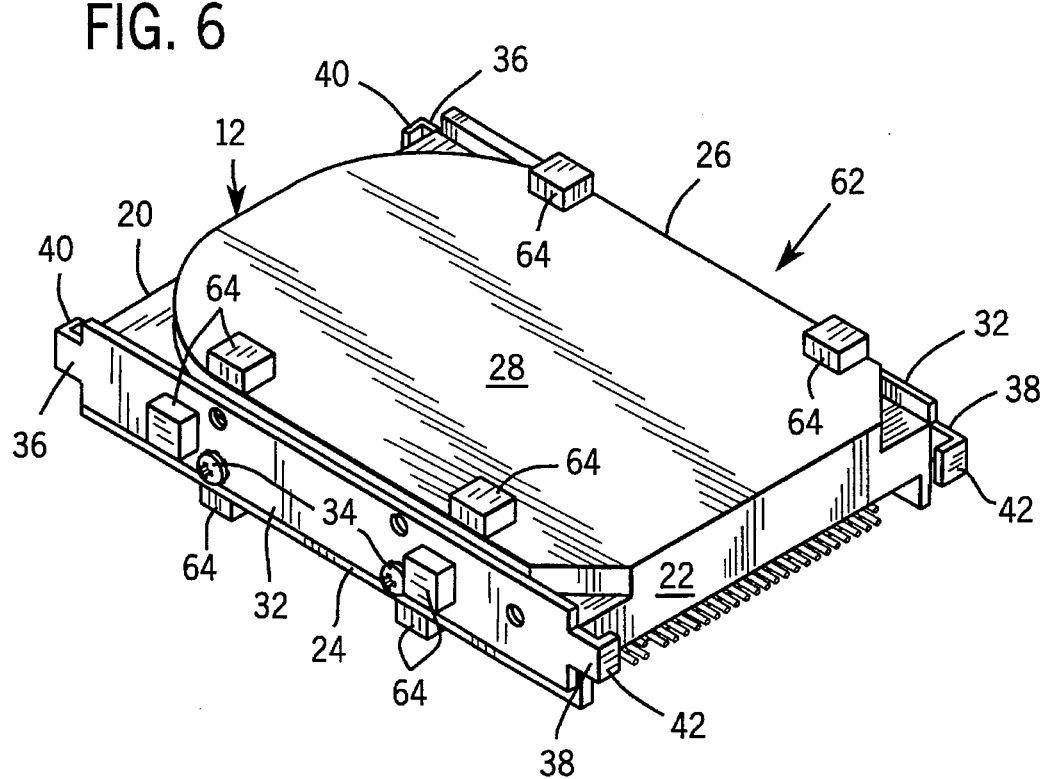
FIG. 6 is a view similar to FIG. 5 but from the opposite side.

As shown in FIGS. 5 and 6, prior to inserting the disk drive 12 into the housing 14, a disk drive assembly 62 is made including the brackets 32 as previously described and shock absorber pads 64. There are a total of 12 shock absorber pads 64 provided in the preferred embodiment on the disk drive assembly 62, 4 on each of the left 28 and right 30 sides, and 2 on each of the top 24 and bottom 26 sides. The shock absorber pads 64 do not span all the way between the disk drive 12 and the housing 14, but an air space exists between the outer surface of each pad 64 and the confronting surface of the housing 14. In the preferred embodiment, this air space is approximately 0.075 inches at the top and bottom and 0.030 inches on each side, and the pads 64 are approximately 0.125 inches thick on the top and bottom and 0.150 inches thick on the sides. Therefore, greater air space and padding is provided on the top and bottom than on the sides.

When the housing 14 is subjected to vibration (high frequency, low amplitude mechanical energy), the shock absorber pads 64 are not contacted by the housing 14 and no forces are transmitted from the housing 14 to the disk drive 12 through the pads 64, because of the air spaces between the housing 14 and the pads 64. Only when the housing 14 is subjected to a shock (low frequency high amplitude mechanical energy), such as an impact, is the disk drive assembly 62 displaced enough relative to the housing 14 so that the shock absorber pads 64 contact the housing 14 to absorb the energy.

In the preferred embodiment, the pads 64 are preferably a relatively soft elastomeric material with a slow response time, and are mounted to the disk drive 12 with a suitable adhesive. In the preferred embodiment, the material used is an elastomeric material known as SORBOTHANE having a 30 durometer hardness, which is commercially available from Sorbothane, Inc. of Kent, Ohio. As is well known, such material may be coated with talcum powder to prevent pieces from sticking to one 30 another during shipment and assembly, and from undesirably adhering to adjacent parts in the assembly, for example, from sticking to a confronting surface of the housing 14 if that surface is contacted by a pad 64.

The support system 10 also includes a mount 68 at each corner between the disk drive 12 and the housing 14, for a total of four mounts 68. Each mount 68 is in the form of a rectangular parallelepiped having a front face 70, a rear face 72, a top side 74, a bottom side 76, a left side 78 and a right side 80. In the preferred form, each mount 68 is substantially wider and higher than it is thick. For example, in the preferred embodiment, each mount 68 is 0.125 thick (from front to rear) 0.58 inches high, and 0.56 inches wide.

Referring particularly to FIGS. 7–9, each mount 68 has three slots which are in general registration with one another from top to bottom, including a drive mounting slot 82, a housing mounting slot 84, and an intermediate slot 86. The slots 82, 84 and 86, together with the sides 70, 72, 74, 76, 78 and 80 define each mount 68 into a drive mounting portion 88 which includes a bar (the material of mount 68 which is directly above and below slot 82) of elastomeric material in which slot 82 is formed, housing mounting portion 90 which includes a bar (the material of mount 68 which is directly above and below slot 84) of elastomeric material in which slot 84 is formed, and connecting portions or bars 92 and 94 which bridge the left and right ends of the portions 88 and 90 and extend from the top side 74 to the bottom side 76 outside of the slots 82, 84 and 86 to the adjacent side 78 or 80. Reference numbers have been applied to mount 68 shown in FIGS. 7–9 as if it was the top front mount 68 shown in FIG. 1. However, it should be understood that except as described below, each mount 68 may be assembled in any orientation between the housing 14 and the drive assembly 62, so that the bottom may be the top in a different orientation, or the left side may be the right side in a different orientation.

The slots 82 and 84 are sized to closely fit around the tangs 36, 38, 56 and 58 with the ears 40, 42, 57 and 59 preventing the mounts 68 from coming off of the tangs. The ears do this by overlapping a portion of the outer face of their corresponding mount 68. While the tang-in-slot mounting of the disk drive 12 and housing 14 to each mount 68 is preferred, aspects of the invention could be practiced with other forms of connection between the drive and the mount and between the housing and the mount.

The construction of the mounts 68 prevents forces from being transmitted through the mounts 68 by direct compression of the elastomeric material between the mounting portions 88 and 90. In other words, for forces to be transmitted from the housing 14 to the disk drive 12 through the mounts 68, the mounts 68 are always subjected to at least some internal component of force acting in shear with resect to the mounting portions 88 and 90. Although compressive forces also take place within the mounts 68 in transmitting forces between the housing 14 and the disk drive 12, e.g. within connecting portions 92 and 94. the net force path through each mount 68 requires that each mount 68 be subjected to internal shear stresses e.g. between the mounting portions 88 and 90, and the connecting portions 92 and 94, For example, event loading which occurs when a drive tang is moved straight toward a housing tang, which places connecting portions 92 and 94 of the 68 in compression still exhibits shear loading of the mounting portions 88 and 90 with respect to the connecting portions 92 and 94. This is because there is no straight line path between the drive connection zone 88 and the housing connection zone 90 of the mount 68 which is not interrupted by intermediate slot 86. As such, there is no column of material between the two zones along which compressive forces can be directly transmitted.

This feature is provided by the absence of material between the drive mounting portion 88 and the housing mounting portion 90, provided by intermediate slot 86. If intermediate slot 86 were not present and instead mount 68 were solid where slot 86 is, then the material of the mount between the slots 82 and 84 would be subjected to direct compression between the tang of the disk drive and the tang of the housing when vertical vibrations were transmitted between the housing 14 and the disk drive 12. This would result in significant vibrations being transmitted to the drive 12. This is the case because it has been found that energy absorbing elastomers are relatively ineffective to absorb high frequency low amplitude vibrations in compression, but are significantly more effective to absorb such energy when they are loaded in shear.

Preferably, the two mounts 68 at the top of the system 10 are identical to one another and have a somewhat higher hardness than the two mounts 68 at the bottom of the system 10, which are also identical to one another. This is to account for the effects of gravity and the difference in the strengths of the members 68 when they are subjected to static tension (the top mounts 68) versus when they are subjected to largely compressive static forces (as in the bottom mounts 68).

In the preferred embodiment, all four mounts are formed of an elastomeric material known as SORBOTHANE which is commercially available from Sorbothane, Inc. of Kent, Ohio, and are also preferably talcum powder coated to reduce their natural adhesion. With this material, the two top mounts 68 are preferably of a 50 durometer hardness and the two bottom mounts 68 are preferably of a 40 durometer hardness, with the slots 82, 84 and 86 spaced approximately 0.070 inches apart and being 0.270 inches long, and the slots 82 and 84 spaced approximately 0.125 inches from their adjacent top or bottom side.

In some applications, the mounts 68 may have a tendency to tear if subjected to excessive stresses. To help alleviate this, it is possible using known techniques to mold into each mount 68 a layer of a one-directional stretch fabric material for reinforcement. In the preferred embodiment, the fabric stretches in the vertical direction (from top 74 to bottom 76) and is molded into the mount 68 so as to be adjacent to one of the sides 70 or 72, and the mounts 68 are assembled with the fabric side facing outward (i.e., away from disk drive 12). With such mounts, the fabric should be slit in the area of the slots, for example as indicated by the dashed lines 100 in FIG. 10, so as to receive the tangs 36, 38, 56 and 58 and not interfere with the operation of the intermediate slot 86.

A preferred embodiment of the invention has been described in considerable detail. Many modifications and variations to the embodiment described will be apparent to those skilled in the art. For example, multiple voids could be formed between the drive connection zone 88 and the housing connection zone 90 of the mount 68, so long as there is no straight line (i.e., direct) path between the zones which is not interrupted by a void. Moreover, in some applications shock absorber pads may not be necessary, or could be provided on the housing rather than the disk drive. Therefore, the invention should not be limited to the embodiment described, but should be defined by the claims which follow.

We claim:

1. A disk drive support system comprising:

a support housing;

a disk drive;

a plurality of elastomeric mounts extending between said support housing and said disk drive, each said mount including:

a first portion for fixation to said support housing;

a second portion for fixation to said disk drive; and a third portion spanning said first portion and said second portion, wherein said third portion engages sides of said first and second portions so that no elastomeric material of the mount exists between said first and second portions, thereby requiring a force acting between said first and second portions to include at least some component of force acting in shear; and a plurality of elastomeric pads positioned between but not spanning confronting surfaces of said support housing and said disk drive.

2. A disk drive support system as claimed in claim 1, wherein:

said first portion includes a first bar having a first end and a second end which form the respective sides of the first portion;

said second portion includes a second bar having a first end and a second end which form the respective sides of the second portion;

said second bar is generally parallel to, in registration with and spaced apart from said first bar; and said third portion includes third and fourth bars, said third bar bridging the first ends of the first and second bars and said fourth bar bridging the second ends of the first and second bars.

3. A disk drive support system as claimed in claim 2, wherein said first, second, third and fourth bars are integral with one another.

4. A disk drive support system as claimed in claim 1, wherein at least one of said plurality of mounts is positioned above said disk drive and at least one of said plurality of mounts is positioned below said disk drive.

5. A disk drive support system as claimed in claim 4, wherein at least two of said plurality of mounts are positioned above said disk drive and at least two of said plurality of mounts are positioned below said disk drive.

6. A disk drive support system as claimed in claim 5, wherein said at least two mounts positioned above said disk drive are of a higher durometer hardness than said at least two mounts positioned below said disk drive.

7. A disk drive support system as claimed in claim 1, wherein said pads are formed of an elastomeric material having a lower durometer hardness than said mounts.

8. An elastomeric support system for a disk drive, comprising:

a housing having four corners;

four drive tangs rigidly affixed to a disk drive positioned within said housing, each of said drive tangs being adjacent to a different one of said four corners; and four elastomeric mounts, each said mount affixed to a different one of said four corners at a housing connection zone and being affixed to an adjacent drive tang at a drive connection zone, wherein one or more voids are formed in each said mount such that any straight line path through said mount between said connection zones is interrupted by at least one of said voids;

wherein (a) said housing is oriented so that each said mount extends vertically in the direction between its connection zones, (b) two of said mounts extend above said disk drive and two of said mounts extend below said disk drive, and (c) said two mounts which extend above said disk drive are of a higher durometer hardness than said two mounts which extend below said disk drive.

9. An elastomeric support system for a disk drive as claimed in claim 8, further comprising shock absorber pads inside of said housing between said housing and said disk drive, said shock absorber pads being of a lower durometer hardness than said mounts.

10. An elastomeric support system for a disk drive as claimed in claim 8, wherein said housing is fixed to a printed circuit board.

* * * * *